Inventors.
Howard S. McQuaid
Roy C. Mitchell
by Heard Smith & Tennant.
Attys.

Patented Apr. 29, 1924.

1,492,391

UNITED STATES PATENT OFFICE.

HOWARD S. McQUAID, OF EDGEWOOD, MARYLAND, AND ROY C. MITCHELL, OF EAST WOODBURY, NEW JERSEY.

PROCESS AND APPARATUS FOR HANDLING CHLORINE.

Application filed September 14, 1923. Serial No. 662,758.

*To all whom it may concern:*

Be it known that we, HOWARD S. McQUAID and ROY C. MITCHELL, both citizens of the United States, and residents of Edgewood, county of Harford, State of Maryland, and East Woodbury, county of Gloucester, State of New Jersey, respectively, have invented an Improvement in Processes and Apparatus for Handling Chlorine, of which the following description, in connection with the accompanying drawing, is a specification, like characters on the drawing representing like parts.

This invention relates to a process and apparatus for handling chlorine gas and particularly to a process and apparatus for compressing chlorine gas.

It is well known that chlorine is an extremely active element and heretofore great trouble has been encountered in compressing and otherwise handling the element. Trouble has been particularly encountered at the valves through which the chlorine passes and the operating parts of the compressors which are subject to contact with the chlorine. The valves and machine parts become pitted and are eaten away or otherwise deteriorate quite rapidly due to the action of the chlorine.

It is customary in pumps for compressing chlorine to use either fish oil or concentrated sulphuric acid as a lubricant and protective liquid for the purpose of protecting the parts of the pump from the deteriorating action of the chlorine. The fish oil is unsatisfactory because, while it protects to a large extent the parts of the compressor, the oil itself soon becomes gummy by contact with the chlorine and loses its lubricating properties. This results in the necessity of changing the oil frequently with the consequent disadvantages of lost use of the compressor and expense incident thereto.

Concentrated sulphuric acid has proven unsatisfactory because the acid is extremely hydroscopic and extremely corrosive when it becomes saturated with chlorine. The result of this is that the chlorine equipment is quickly damaged and must be repaired which is unpleasant and dangerous due to the presence of the concentrated acid.

It is an object of the present invention to disclose a process for handling chlorine and an apparatus for carrying out the process using a substance in place of the fish oil or concentrated acid which substance may be employed with perfect safety and will effectively protect the parts of the apparatus from the action of the chlorine. The substance does not become gummy even though it remains indefinitely in contact with the chlorine and will not react with the gas to be handled so as to cause deterioration either of the gas or the substance. The substance is non-hydroscopic, non-drying, non-corrosive to metals and non-reacting to chlorine and in all respects is an ideal substance to use as a lubricant and protecting element in all types of apparatus used in handling chlorine.

Other objects and features of the invention will more fully appear from the following description and accompanying drawings and will be particularly pointed out in the claims.

The drawings illustrate preferred forms of construction of apparatus for handling chlorine gas in which the process may be carried out and embody the broad principles of the invention.

Three types of apparatus for compressing chlorine are illustrated herein and will now be described.

Figure 1:
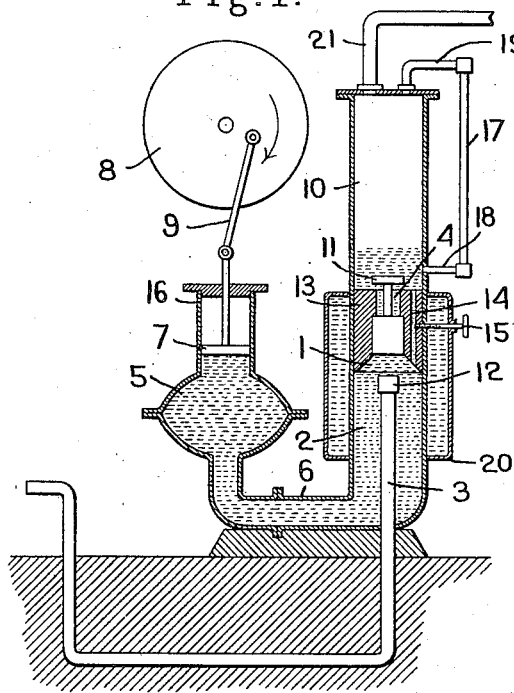
Fig. 1 is an apparatus using a reciprocating liquid plunger.

The type illustrated in Fig. 1 is particularly useful in compressing chlorine gas to such a degree that it may be liquefied. The apparatus comprises a compression chamber 1 in which chlorine may be compressed by means of a liquid plunger 2, the chamber having a chlorine inlet pipe 3 and an outlet 4 for the compressed gas. The compression chamber 1 communicates with a liquid reservoir 5 by means of a U-tube 6. The liquid is moved from the reservoir 5 to the compression chamber 1 by means of a piston 7 operated in any suitable manner as by a driving wheel 8 connected to the piston by means of a connecting rod 9. When the parts are in the position shown in Fig. 1 the piston is near the end of its downward stroke and during the first part of the downward stroke the body of chlorine gas in the compression chamber 1 is under pressure and is being forced into a gas reservoir 10 which holds the compressed gas after it leaves the compression chamber. The compression chamber 1 communicates by means of the outlet 4 with a gas reservoir 10. The outlet 4 is closed by a valve 11 of such a type that it prevents the passage of gas from the gas reservoir 10 into the compression chamber 1 but permits the passage of gas in the reverse direction. The end of the inlet passage 3 is closed by means of a valve 12 which permits the chlorine gas which is to be compressed to enter the compression chamber but prevents the flow of gas from the compression chamber back into the inlet pipe. A plug 13 is placed in the apparatus as shown and serves to separate the compression chamber from the reservoir 10. A small opening 14 extends entirely through this plug communicating at one end with the compression chamber and at the other end with the gas reservoir to permit a small flow of the liquid from the reservoir 10 into the space below the plug in order that there may always be enough liquid below the plug to fill the compression chamber and force all of the chlorine from the compression chamber into the reservoir when the piston 7 is at the bottom of its stroke. The opening may be restricted as desired or entirely closed by means of a screw 15.

The operation of the apparatus is extremely simple. Upon the retraction of the piston 7 to the top 16 of the cylinder in which it operates the liquid 2 is sucked from the chamber 1 through the tube 6 and follows the piston until it fills the cylinder thus causing the withdrawal of the liquid plunger from the compression chamber. This causes a reduced pressure within the compression chamber 1 and chlorine gas is sucked from the inlet pipe 3 into the chamber. The passage of gas from the reservoir 10 to the chamber 1 is prevented by means of a valve 11. When the piston 7 moves downwardly, the liquid plunger rises in the chamber 1 compressing the gas and forcing it into the reservoir 10.

In order to insure that there is always sufficient liquid within the apparatus to completely fill the compression chamber 1 and expel all of the chlorine gas therefrom when the piston 7 is at the bottom of its stroke, enough liquid is used in the pump not only to fill the chambers 1 and 5 and the tube 6 but also to partially fill the chamber 10. The chamber 10, therefore, acts as a reservoir for the liquid and should any of the liquid leak from the chamber 5 or tube 6 the liquid in the reservoir 10 flows through the opening 14 into the chamber 1 when the pressure in the chamber 1 is reduced. Thus there is always sufficient of the liquid below the plug 13 to completely fill the chamber 1 when the piston 7 moves downwardly and the excess liquid passes with the gas through the outlet 4 back into the reservoir 10.

To determine the height of the liquid in the reservoir a glass sight tube 17 is placed beside the reservoir 10 and communicates therewith by means of pipes 18 and 19 in the usual manner. In order to absorb the heat of compression the compression chamber is surrounded by a water jacket 20 through which passes cooling water. A draw-off pipe 21 communicating with the reservoir 10 permits the compressed chlorine to be drawn off into containers or liquefaction apparatus.

It is readily seen from the apparatus shown in Fig. 1 and the description thereof that the liquid 2 is the element of the apparatus which is always in contact with the gas and said liquid acts as a plunger operating within the chamber, having the liquid as the surface in contact with the chlorine gas. The liquid also acts as a liquid seal, a valve packing and a lubricant for the valves 11 and 12 and the plunger 7. This liquid is an element having such properties that it will not react with the chlorine gas to be compressed so as to cause deterioration either of the gas or the element. The liquid also has such properties that it does not react with the parts of the apparatus and as readily understood from the drawings and the above description the liquid coats all parts of the apparatus. Thus the apparatus has as the surface in contact with the chlorine an element having such properties that it will not react with the parts of the apparatus or the chlorine gas so as to cause deterioration either of the gas or the element and will protect the apparatus from the action of the chlorine while serving as a lubricant in the apparatus.

Figure 2:
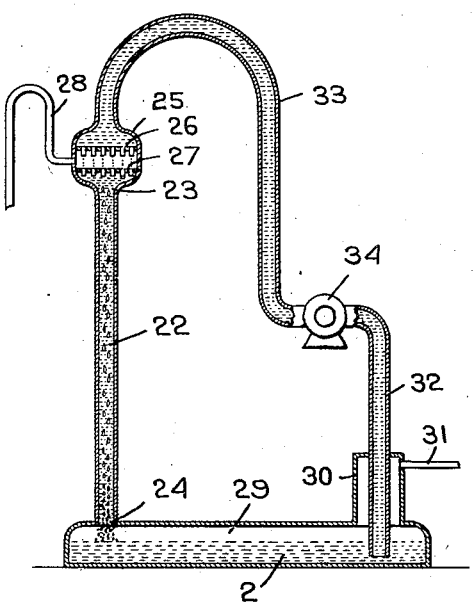
Fig. 2 is an apparatus using a liquid plunger formed by a falling column of liquid.

The apparatus shown in Fig. 2 may be termed a falling column of liquid compression apparatus. The apparatus comprises a compression chamber 22 having an inlet opening 23 and an outlet opening 24. The inert liquid enters the compression chamber through a header 25. The header comprises an upper plate 26 and a lower plate 27 provided with a plurality of small tubes through which passes the liquid. The plates 26 and 27 are spaced apart with the upper plate exactly over the tubes of the lower plate so that streams of liquid leaving the tubes of the upper plate are forced through the tubes of the lower plate. Chlorine gas to be compressed is admitted by means of a pipe 28 into the space between the upper and lower plates where it is trapped and passes with the liquid through the tubes in the lower plate into the compression chamber 22. The liquid containing the bubbles of chlorine gas falls through the chamber 22 into the reservoir 29 in which the liquid and gas separate, the gas rising to the top of the chamber and the liquid forming a layer on the bottom thereof. A gas dome 30 is placed above the reservoir 29 and communicates therewith so that the gas may pass into said dome, from which it is led off to containers or liquefaction apparatus by means of a pipe 31. The liquid in the bottom of the reservoir 29 is removed therefrom by means of a pipe 32 and passes by means of a pipe 33 to the header in which it again entraps chlorine thus repeating the process of compressing the gas. The liquid is forced through the pipes 32 and 33 by means of a suitable pump 34.

In the type of apparatus disclosed in Fig. 2 and just described, the falling column of liquid acts as a plunger which compresses the chlorine and it is readily seen that during the operation of the apparatus the liquid is the surface which is always in contact with the chlorine.

Figure 3:
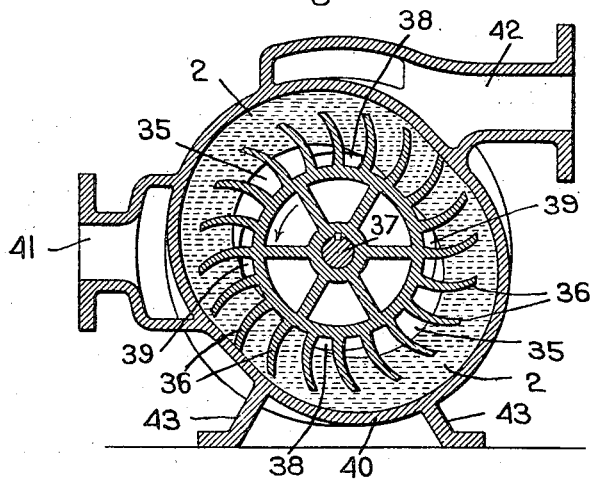
Fig. 3 is an apparatus employing a reciprocating liquid plunger operating in a plurality of chambers.

In the type of apparatus illustrated in Fig. 3 there are a plurality of compression chambers 35 which are formed by the vanes 36 rotatably mounted on the shaft 37. Chlorine gas to be compressed is admitted to the compression chamber by means of inlet openings 38 and is expelled through outlet openings 39. The liquid is moved back and forth in the chambers to compress the chlorine gas by means of an elliptical casing 40. The chambers revolve in the direction of the arrow, and as they advance the elliptical casing permits centrifugal force to move liquid from the inner end to the outer end of said chambers. The inlet and outlet openings are so positioned with regard to the contour of the casing that the liquid moves toward the outer end of the chamber just at the time that the bottom of the chambers come opposite the inlet openings with the result that as the liquid moves outwardly chlorine gas is sucked into the chambers to fill the spaces left by the outward movement of the liquid. As the chambers continue to revolve and due to the contour of the casing adjacent the outlet openings the liquid is forced inwardly toward the bottom of the chambers and thus forces the gas out through the outlet openings. It is readily seen that the liquid reciprocating within the chambers acts as a plunger and that the gas which passes from the outlet openings is under pressure determined by the movement of the plunger. A chlorine gas supply main 41 communicates with the inlet openings in order that chlorine gas may be supplied to the pump, and an exhaust main 42 leads from the outlet opening to the containers for the compressed gas or liquefaction apparatus. The casing is supported on suitable legs 43. It is to be noted that in this type of apparatus as well as the types heretofore described, liquid acts as a protection for the parts of the apparatus and forms a coating for the apparatus so that the surface in contact with the chlorine is of liquid. The liquid also serves to lubricate all parts of the apparatus.

The liquid, which is the important element in all types of apparatus, is one which will not react with the chlorine to cause deterioration either of the gas or of the liquid. The liquid is non-hydroscopic, non-drying, and non-corrosive to metal in addition to being non-reacting to chlorine. Since the liquid will not react with the chlorine it does not contaminate the chlorine in any way or give reaction products which will contaminate the chlorine. Being non-corrosive to metals the liquid does not eat away the parts of the apparatus in which it is used and, being non-drying no loss is occasioned by its constant use except such mechanical loss as is due to leakage from imperfect apparatus. Since the liquid does not react with the chlorine it does not become gummy as does fish oil, and, being non-hydroscopic, it does not have the disadvantages which are attendant on the use of concentrated sulphuric acid.

The liquid is chlorinated petroleum distillate or compounds of components thereof. The most satisfactory liquid for use in handling chlorine is petroleum ether which has been chlorinated to saturation at a temperature of 212° F. It has been found that this chlorinated compound has all the properties of an oil as far as necessary to thoroughly lubricate all moving parts of the compression apparatus and is very effective as a seal for valves in the pipe lines or other parts of the apparatus in which the chlorine is compressed or otherwise handled. Although chlorinated petroleum ether has been found particularly desirable for use in compression apparatus when running at normal temperatures, it is desirable at times to use a liquid which has more body and which distills at a higher temperature. For this purpose the liquid may be a petroleum distillate which distills at 200° F. This distillate is then chlorinated and used either alone or in a mixture comprising any suitable amount of chlorinated petroleum ether or other petroleum distillate.

The petroleum distillates may be chlorinated in any suitable manner. It has been found convenient to heat the distillate to a temperature of 212° F. while passing chlorine through the distillate until it refuses to take up any more chlorine. Whether the chlorine reacts chemically with the petroleum distillate during the saturation process is not known due to the inadequate methods at present used for analyzing complicated carbon compounds. It has been found however, that if the petroleum distillate is thoroughly saturated with chlorine at 212° F. the resulting element does not react with chlorine in the compression apparatus and it thoroughly protects the apparatus from the action of the chlorine gas. The elements also have very efficient lubricating properties which makes it very desirable for use in the compression apparatus and is not dangerous or unpleasant to work with should the operator come in contact with the liquid.

Although chlorinated petroleum ether has been found to be the most desirable element for use in compression apparatus it is desired that the invention be construed so as to include hydrocarbons which have been chlorinated. It is also desired that the invention be construed as broadly as the limitations in the claims, taken in conjunction with the prior art, may allow.

Having thus described the invention, what is claimed as new and desired to be secured by Letters Patent is:

1. The process of compressing chlorine gas which consists in applying compressive force to the gas through the medium of a hydrocarbon derivative which is non-hydroscopic, non-drying non-corrosive to metals and non-reactive to chlorine.

2. The process of compressing chlorine gas which consists in applying compressive force to the gas through the medium of a chlorinated compound of petroleum distillates.

3. The process of compressing chlorine gas which consists in applying compressive force to the gas through the medium of a material comprising a petroleum distillate saturated with chlorine.

4. The process of compressing chlorine gas which consists in applying compressive force to the gas through the medium of a chlorinated component of petroleum distillates.

5. The process of compressing chlorine gas which consists in applying compressive force to the gas through the medium of a compound of petroleum distillates which has been chlorinated to saturation at 212° F.

6. The process of compressing chlorine gas which consists in applying compressive force to the gas through the medium of chlorinated petroleum ether.

7. The process of compressing chlorine gas which consists in applying compressive force to the gas through the medium of petroleum ether which has been chlorinated to saturation at 212° F.

8. The process of compressing chlorine gas which consists in applying compressive force to the gas by moving against the gas a fluid plunger which is a hydrocarbon derivative being non-hydroscopic, non-drying, non-corrosive to metals, and non-reacting to chlorine.

9. An apparatus for compressing chlorine gas comprising chlorine gas compressing means having as the surface in contact with the chlorine gas an oil having such properties that it will not react with the parts of the apparatus or the chlorine gas so as to cause deterioration either of the gas or the oil, and will protect the apparatus from the action of the chlorine while serving as a lubricant in the apparatus.

10. An apparatus for compressing chlorine gas comprising chlorine gas compressing means having a chlorinated compound of petroleum distillates as the surface in contact with the chlorine gas.

11. An apparatus for compressing chlorine gas having a chamber with gas inlet and outlet openings, and a plunger operating within the chamber having as the surface in contact with the chlorine gas a chlorinated component of petroleum distillates.

12. An apparatus for compressing chlorine gas having a chamber with gas inlet and outlet openings, and a fluid plunger of chlorinated petroleum ether operating within the chamber to compress the gas.

13. An apparatus for handling chlorine gas comprising chlorine gas controlling means having as a surface in contact with the chlorine a material including a petroleum distillate saturated with chlorine.

14. An apparatus for handling chlorine gas comprising a chlorine gas controlling means including a chlorinated hydrocarbon having such properties that it will not react with the parts of the apparatus or the chlorine gas so as to cause deterioration either of said means or said gas.

15. An apparatus for handling chlorine gas comprising a chlorine gas controlling means including a petroleum distillate saturated with chlorine and having such properties that it will not react with the parts of the apparatus or the chlorine gas so as to cause deterioration either of said means or said gas.

16. An apparatus for handling chlorine gas comprising chlorine gas controlling means including an oil having such properties that it will not react with the parts of the apparatus or the chlorine gas so as to cause deterioration either of the gas or the oil and will protect the apparatus from the action of the chlorine while lubricating said apparatus.

In testimony whereof, we have signed our names to this specification.

HOWARD S. McQUAID.
ROY C. MITCHELL.